(12) United States Patent (10) Patent No.: US 6,833,075 B2
Hughes (45) Date of Patent: Dec. 21, 2004

(54) PROCESS FOR PREPARING REACTIVE COMPOSITIONS FOR FLUID TREATMENT

(75) Inventor: Kenneth D. Hughes, Alpharetta, GA (US)

(73) Assignee: Watervisions International, Inc., Cumming, GA (US)

( * ) Notice: Subject to any disclaimer, the term of this patent is extended or adjusted under 35 U.S.C. 154(b) by 110 days.

(21) Appl. No.: 10/125,072

(22) Filed: Apr. 17, 2002

(65) Prior Publication Data

US 2003/0196960 A1 Oct. 23, 2003

(51) Int. Cl.$^7$ .............................. C02F 1/42; B01J 20/02; B01J 20/10
(52) U.S. Cl. .................... 210/679; 210/681; 210/502.1; 210/504; 210/505; 210/506; 502/407
(58) Field of Search ................................. 210/679, 681, 210/502.1, 503, 504, 505, 506; 502/400, 407; 95/285

(56) References Cited

U.S. PATENT DOCUMENTS

| | | | |
|---|---|---|---|
| 5,189,092 A | 2/1993 | Koslow | |
| 5,249,948 A | 10/1993 | Koslow | |
| 5,331,037 A | 7/1994 | Koslow | |
| 5,770,416 A | * 6/1998 | Lihme et al. | ............... 435/176 |
| 6,180,016 B1 | 1/2001 | Johnston et al. | |
| 6,187,192 B1 | 2/2001 | Johnston et al. | |

* cited by examiner

*Primary Examiner*—Robert A. Hopkins
(74) *Attorney, Agent, or Firm*—Kilpatrick Stockton LLP; Dean W. Russell; Robert E. Richards

(57) ABSTRACT

A method and device for filtration and/or purification of fluids water or other solutions containing microbiological and chemical contaminants, such as fluids containing metals, water treatment chemicals, reactive chemicals and microorganisms, where the fluid is passed through a composite material composed of fluid treatment media with or without a binder matrix in which the filtration media, binder, or support structures, or a combination thereof contains a surface treatment.

125 Claims, 1 Drawing Sheet

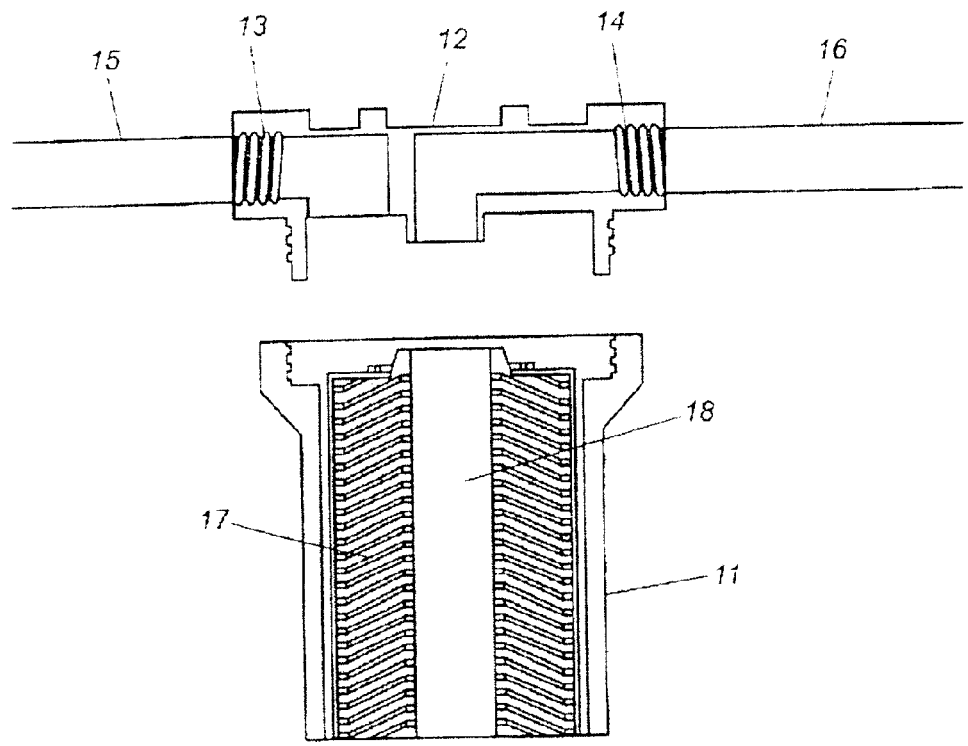
Fig. 1
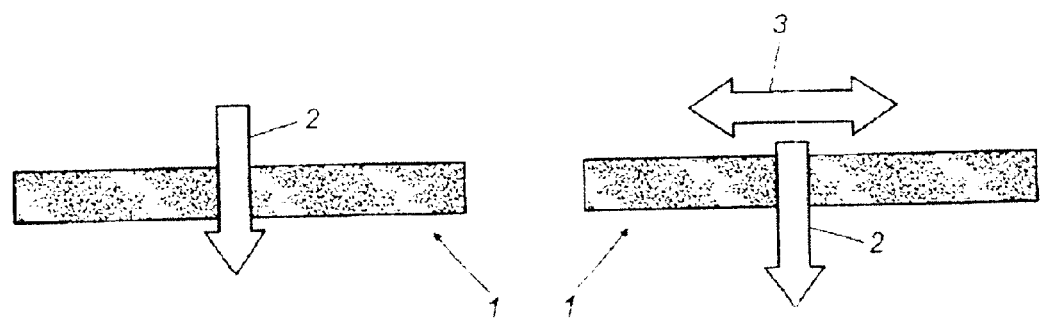
Fig. 2a  Fig. 2b

US 6,833,075 B2

PROCESS FOR PREPARING REACTIVE COMPOSITIONS FOR FLUID TREATMENT

FIELD OF THE INVENTION

This invention relates generally to the field of solution and fluid treatment devices, primarily to aqueous solution and water treatment, devices for gases and industrial fluids and other aqueous liquids, which modify the components of the gas or aqueous liquid solution passed through them. In its more particular aspects, the invention relates to the field of such devices that reduce chemical and microbiological contaminants, including toxic metals and water treatment chemicals, bacteria and viruses and their components, contained in water or aqueous solutions.

DESCRIPTION OF RELATED ART

Purification or filtration of water or other aqueous solutions is necessary for many applications, from the provision of safe or potable drinking water to biotechnology applications including fermentation processing and separation of components from biological fluids, and to industrial processes that require waste stream treatment and recovery of process chemicals. Similarly, the removal of contaminants from fluids used in medical procedures and semiconductor fabrication processes, where ultrapurified fluids are required, and in environments where the fluids will be recirculated, such as aircraft or spacecraft, is also an important application for filtration and fluid treatment materials. In recent years, the need for water filtration and purification in the home has become more recognized, and the competing concerns of energy efficiency and residential fluid quality have lead to numerous filtration products, that purport to remove small particles, allergens, microorganisms, intentionally introduced biotoxins, pesticides, and toxic metals such as lead, mercury, and arsenic.

There are many well-known methods currently used for water purification, such as reverse osmosis, distillation, ion-exchange, chemical adsorption, coagulation, and filtering or retention. Particle filtration may be completed through the use of membranes or layers of granular materials. Other fluid purification techniques involve chemical introduction which alters the state or chemical identity of the contaminant. Examples of chemical additives include oxidizing agents, flocculating agents, and precipitation agents.

In many fluid purification applications a combination of techniques are required in order to completely purify fluids, such as water. Combinations of technologies may be implemented by combining functions in a single device or using several different devices and technologies in series where each performs a distinct function. Examples of this practice include the use of mixed ion-exchange resins that remove both negative and positively charged chemical species and oxidation/filtration methods where oxidizers are used to generate particulate matter that may be subsequently filtered.

Many of these fluid purification technologies, techniques, and practices are costly, energy inefficient and/or require significant technical know-how and sophistication to implement on both large and small scales. As a result, many advanced fluid purification technologies have had limited application in residential point of entry (POE) and point of use (POU) applications.

Unfortunately, currently available low cost, simple techniques and inexpensive devices fabricated for residential POU/POE markets do not adequately meet the contaminant removal levels required by regulatory agencies. For example, simple sink POU water purification devices containing activated carbon or portable units for campers and hikers can not remove microorganisms or chemical toxins such as heavy metals to regulatory levels.

Technologies and devices that are inexpensive for continual use on an annual basis, simple to operate, contain low concentrations of safe chemicals, and are highly efficient at removing both microbiological and chemical impurities have numerous applications if they can be developed. In particular, technologies and devices with these characteristics have application in potable water treatment, cooling water treatment, and in the fields of semiconductor fabrication and manipulation, mining, biotechnology, healthcare, and the food and beverage industries. Such technologies and devices would also be useful in the processing of fluids in many industries where fluids require recycling or reuse. Furthermore these technologies and devices would be invaluable reclamation tools for recovering chemical constituents from known environmental waste sites such as abandon mines and super-fund locations.

In the treatment of many fluids the surface properties of the filtration media are manipulated to best suit the contaminant or fluid component targeted. Surface properties of both organic and inorganic materials are a: function of the chemical composition of the material and processing methods used to manipulate the material. Surface properties can be tuned to be ion or molecule specific or generated to interact with a broad range of different chemical and biological species.

There is much prior art in the fields of isolating natural materials and synthesizing materials with useful surface properties. Surface properties can include a range of electric charge from positive through neutral to negative, with a number of different surface active chemical species. As example carbon is known to interact differently with many chemical compounds based on the carbon source and the processing methods used to "activate" the carbon. As further example, synthetic materials know as ionic exchange resins can be manufactured to contain a range of positive or negative charged surface components. The composition of the resin and the specific identity of the surface component determine the applicability of the material for different treatment processes.

Surfaces may be modified by heat treatment, chemical action, biological action, and/or a combination thereof. Examples include calcining clay materials, steam and heat activating carbon materials, and using chemical reagents to temporarily or permanently attach many different molecules to the surface. Examples of the latter include biological compounds such as proteins and peptides, pharmaceutical compounds, and molecules carrying electrical charges for the direct interaction with chemicals, cells, microorganisms or for the purpose of controlling electrical charge buildup.

Specifically, it has been recognized in the art of surface treatment that charged surfaces can control the interaction with chemical and biological contaminants. Examples include the use of positive charged surfaces to remove negatively charged fluid contaminants including toxic metals such as arsenic, anions that contribute to the total dissolved solid content of water including sulfates and chlorides, and microorganisms such as viruses, bacteria, and the components of microorganisms.

There is much existing art involving the treatment of material surfaces to modify surface function. This art includes that which has been developed in the field of paper science, fiber processing, air filtration, and surface protection. Still further the modification of medical devices with surface coatings to improve biocompatibility is an active area of research.

However there is little known art in the surface treatment of materials used for composite formation in the field of fluid purification where composites which may or may not contain binder materials are fabricated from inexpensive fluid treatment materials.

As a result there are no known commercially available or other fluid purification devices incorporating composites composed of fluid treatment media such as carbon, metal phosphates, metal oxides, reduced metals, silicates, metal sulfates, metal carbonates, silicates, metal hydroxides, or combinations thereof, in loose particulate or fiber form or with material binders, which have been modified by chemical surface treatments.

Further, there have been no known prior descriptions of processes to prepare composite fluid purification materials and devices that contain composites carrying surface treatments. Furthermore there are no known composites such as those described that can perform both chemical reactions and chemical and biological contaminant removal at the levels described.

Accordingly, there remains a need in this art for an uncomplicated, safe, and inexpensive fluid purification and filtration method and devices that can provide the ability to simultaneously decrease the concentration of both chemical and microbiological species. More specifically there is an urgent need for inexpensive technology that can meet the requirements of national and global regulatory agencies.

Additionally, a simple means for incorporating surface treated fluid treatment materials such as carbon, metal phosphates, metal oxides, reduced metals, silicates, metal sulfates, metal carbonates, silicates, metal hydroxides, or combinations thereof obtained from natural and synthetic materials and in some cases associated binders into inexpensive fluid treatment devices is highly desired.

It is the intention of this invention and art to use composite preparations incorporating both simple and complex mixtures of surface treated fluid treatment medias such as carbon, metal phosphates, metal oxides, reduced metals, silicates, metal sulfates, metal carbonates, silicates, metal hydroxides, or combinations thereof, to generate a practical fluid purification technology, filtration devices, and techniques. It is a further intention of this invention to permit fabrication of these composites by use of materials in forms which are readily available and commonly found naturally or synthesized by a variety of different methods.

There is also a need in the art for a method and devices that simultaneously meet the minimum regulatory safety requirements for fluid treatment devices as well as heavy metal reduction requirements, such that the device is more than suitable for consumer and industry point-of-use applications.

SUMMARY OF THE INVENTION

To this end, the present inventor has discovered that a significant problem in the treatment of fluids for the removal of chemical and biological contaminants, and other nuisance species present in fluid streams is that materials that can prepared in simple and complex composites with a variety of different surface treatments, which improve their utility have yet to be described. Development of composite technology which can simultaneously reduce both chemical and microbiological contaminants to regulatory levels established by agencies such as the US EPA and the WHO is highly desired.

In the review of prior art some of which is described by WaterVisions Int. in U.S. Pat. No. 6,187,192 and U.S. Pat. No. 6,180,016, and which is incorporated herein in its entirety, the surface function of materials used in the described art is limited to the innate characteristics of the materials used to fabricate the composites. In this invention the innate characteristics of the materials used to fabricate the composites are modified by a surface treatment process using commercially available surface treatment reagents. This additional processing step increases the numbers and types of composite interaction sites available for contaminant removal. In cases where porous containers or composite binders are used these materials may also be surface modified. Furthermore the invention provides for the fabrication of composites where all materials are surface treated before fabrication.

Further, the present invention provides a method for fabricating composite materials containing inexpensive surface treated solids originating from natural sources or synthetic sources or a combination thereof which are capable of performing both oxidative and reductive chemical reactions in fluid treatment applications. In addition, it provides a method for combining materials that have been surface treated with those that have not been surface treated.

The composites of the invention address a gap in currently available technology and serve to meet the unique contaminant reduction needs of consumers in residential settings and increasingly the requirements of many industrial, military, and government institutions.

Additionally, it has been recognized that improvements in the efficiency of the composites that contain surface treated materials may be obtained by using a material binder which may or may not be surface treated. Fluid treatment devices generated with materials in loose form are compromised by channeling and by-pass effects caused by the pressure of fluid, in particular, water and aqueous solutions, flowing through the filter media as well as particle erosion and aggregation. Because contaminants such as toxic compounds, heavy metals, and microorganisms and their components are converted and/or removed by intimate contact with the composite material, even relatively small channels or pathways in granular compositions formed over time by water pressure, water flow, particle erosion, or particle aggregation are easily sufficient to allow passage of untreated contaminants through the device.

One method of this invention solves these problems by providing a composite material containing surface treated materials, devices, and methods for contaminant removal by preparing complex mixtures of fluid treatment carbon, metal phosphates, metal oxides, reduced metals, silicates, metal sulfates, metal carbonates, silicates, metal hydroxides, or combinations thereof, with a binder material which may also be modified by a surface treatment reagent to form a porous filter material that eliminates channeling and contaminant agent by-pass. Furthermore, surface modification of the binder provides the possibility for decreasing hydrophobicity of some binders and improving water contact and in some cases flow through the composite. The binder may obtain surface modification by treatment prior to composite fabrication.

This invention is in general a device and method for the purification and filtration of fluids, in particular aqueous fluids (such as drinking water or swimming or bathing water), or other aqueous solutions (such as fermentation broths, solutions used in cell culture, and in biotechnology applications), or gases and mixtures of gases such as breathable air, found in clean rooms, hospitals, diving equipment homes, aircraft, or spacecraft, and gases used to sparge, purge, or remove particulate matter from surfaces. It may be used as a pretreatment device for subsequent filtration techniques which include membrane treatment, coagulation, flocculation, precipitation, and ion exchange processes which are commonly used in many industries including those which generate potable water, process semiconductor material, are used in medical product manufacture, process industrial fluids, and which address environmental contamination.

The use of the device and method of the invention results in the removal of an extremely high percentage of contaminants, and fluid treatment chemicals such as chlorine compounds and microorganisms. In particular, the use of the device and method of the invention results in purification of water to a level that meets EPA, WHO, and NSF standards for designation as a water treatment device.

In one embodiment, the invention relates to a composite fluid treatment material that contains fluid treatment carbon, metal phosphates, metal oxides, reduced metals, silicates, metal sulfates, metal carbonates, silicates, metal hydroxides, or combinations thereof in particulate or fiber forms or mixtures thereof. Typically, at least a portion of these minerals are in the from of calcium phosphate including monocalcium, dicalcium, and tricalcium forms, iron oxides and phosphates and hydroxides, calcium carbonate, calcium sulfates, and various metal silicates, and has been obtained from natural sources, e.g., mining, natural material processing, or from synthetic sources such as the mixing of chemicals containing the individual elements including calcium, phosphate, iron, and carbonate, sulfate, and silicate. The carbon is typically activated with known processes and in some cases reduced metals may be present. The various composites generated from these minerals and elements are contained in a porous vessel and allows fluid to pass therethrough. In this embodiment the surfaces of the composite materials are modified with surface reactive compounds. As example, silane and siloxane containing compounds are capable of attaching many different polar, charged, and polymeric precursor chemical functionalities to a surface. This treatment process may be used before or after addition of the filtration materials to a porous container. If surface reactive agents are used to modify the filtration materials after addition to a porous container, then the container may also be surface treated. The extent of this treatment depends upon the material composition of the container and the surface treatment reagent used.

In another embodiment, the invention relates to a composite fluid treatment material that contains fluid treatment carbon, metal phosphates, metal oxides, reduced metals, silicates, metal sulfates, metal carbonates, silicates, metal hydroxides, or combinations thereof, is in the form of a porous block as the result of the presence of a binder. Typically, at least a portion of these minerals are in the from of calcium phosphate including monocalcium, dicalcium, and tricalcium forms, iron oxides, phosphates, and hydroxides, calcium carbonate, calcium sulfates, and various metal silicates, and has been obtained from natural sources, e.g., mining, natural material processing, or from synthetic sources such as the mixing of chemicals containing the individual elements including calcium, phosphate, iron, and carbonate, sulfate, and silicate. The carbon is typically activated with known processes and some reduced metal may be present. Also typically, the binder is a polymeric or oligomeric material that is capable of maintaining the particulate minerals and carbon in a porous structure. This allows the fluid treatment composite material to be molded or pressed into any desired shape, e.g., a shape suitable for inclusion into the housing of a filtration device, which provides for fluid inflow and outflow, and which filtration device has one or more chambers for contact of the fluid with the purification material. Such a device forms another embodiment of the invention. In addition to maintaining the minerals and carbon particles immobilized in a unitary block, the polymeric binder also provides desirable physical characteristics to the filter material, e.g., rendering it rigid or flexible, depending upon the type and amount of polymeric binder used. In this embodiment the surfaces of the composite materials are modified with surface reactive compounds. As example, silane and siloxane containing compounds are capable of attaching many different polar, charged, and polymeric precursor chemical functionalities to a surface. This treatment process may be used before or after the filtration materials are immobilized by use of a binder. If surface reactive agents are used to modify the filtration materials after processing with a binder, then the binder may also be surface treated. The extent of this treatment depends upon the composition of the binder and the surface treatment reagent used. In this embodiment the composite material binder may also be surface modified before combination with the filtration material.

In one embodiment, the invention relates to a fluid treatment material that contains fluid treatment carbon, metal phosphates, metal oxides, reduced metals, silicates, metal sulfates, metal carbonates, silicates, metal hydroxides, or combinations thereof in particulate or fiber forms or mixtures thereof. Typically, at least a portion of these minerals are in the from of aluminum oxide, iron oxides, titanium oxide, iron metal, silicon dioxide and carbon, trace elements such as manganese oxides, and the minerals have been obtained from natural sources, e.g., mining, or from synthetic sources such as the mixing of chemicals containing aluminum, iron, silicon, manganese, titanium, or combinations thereof. The carbon is typically activated with known processes and reduced metal may be present. The various composites generated from these minerals and elements are contained in a porous vessel and allows fluid to pass therethrough. In this embodiment the surfaces of the composite materials are modified with surface reactive compounds. As example, silane and siloxane containing compounds are capable of attaching many different polar, charged, and polymeric precursor chemical functionalities to a surface. This treatment process may be used before or after addition of the filtration materials to a porous container. If surface reactive agents are used to modify the filtration materials after addition to a porous container, then the container may also be surface treated. The extent of this treatment depends upon the material composition of the container and the surface treatment reagent used.

In another embodiment, the invention relates to a fluid treatment material that contains fluid treatment carbon, metal phosphates, metal oxides, reduced metals, silicates, metal sulfates, metal carbonates, silicates, metal hydroxides, or combinations thereof that is in the form of a porous block as the result of the presence of a binder. Typically, at least a portion of these minerals are in the from of aluminum oxide, iron oxides, titanium oxide, silicon dioxide and carbon, trace elements such as manganese oxides, and the minerals have been obtained from natural sources, e.g., mining, or from synthetic sources such as the mixing of chemicals containing aluminum, iron, silicon, manganese, titanium, or combinations thereof. The carbon is typically activated with known processes and reduced metal may be present. Also typically, the binder is a polymeric or oligomeric material that is capable of maintaining the particulate minerals and carbon in a block structure. This allows the treatment material to be molded or pressed into any desired shape, e.g., a shape suitable for inclusion into the housing of a filtration device, which provides for fluid inflow and outflow, and which filtration device has one or more chambers for contact of the fluid with the purification material. Such a device forms another embodiment of the invention. In addition to maintaining the mineral and carbon particles immobilized in a unitary block, the polymeric binder also provides desirable physical characteristics to the filter material, e.g., rendering it rigid or flexible, depending upon the type and amount of polymeric binder used. In this embodiment the surfaces of the composite materials are modified with surface reactive compounds. As example, silane and siloxane containing compounds are capable of attaching many different polar, charged, and polymeric precursor chemical functionalities to a surface. This treatment process may be used before or after the filtration materials are immobilized by use of a binder. If surface reactive agents are used to modify the filtration materials after processing with a binder, then the binder may also be surface treated. The extent of this treatment depends upon the composition of the binder and the surface treatment reagent used. In this embodiment the composite material binder may also be surface modified before combination with the filtration material.

In another embodiment, the invention relates to a fluid treatment material that contains fluid treatment carbon and metal oxides. Typically, at least a portion of these metal oxides are in the form of silica or silica containing minerals and have been obtained from natural sources, e.g., mining, or from synthetic sources such as the mixing of chemicals containing metal oxides. The carbon is typically activated with known processes and some reduced metal may be present. The various composites generated from these materials are contained in a porous vessel and allows fluid to pass therethrough. In this embodiment the surfaces of the composite materials are modified with surface reactive compounds. As example, silane and siloxane containing compounds are capable of attaching many different polar, charged, and polymeric precursor chemical functionalities to a surface. This treatment process may be used before or after addition of the filtration materials to a porous container. If surface reactive agents are used to modify the filtration materials after addition to a porous container, then the container may also be surface treated. The extent of this treatment depends upon the material composition of the container and the surface treatment reagent used.

In another embodiment, the invention relates to a fluid treatment material that contains fluid treatment carbon and metal oxides. Typically, at least a portion of these metal oxides are in the form of silica or silica containing minerals and have been obtained from natural sources, e.g., mining, or from synthetic sources such as the mixing of chemicals containing metal oxides. The carbon is typically activated with known processes and reduced metals may be present. Also typically, the binder is a polymeric or oligomeric material that is capable of maintaining the particulate minerals and carbon in a block structure. This allows the treatment material to be molded or pressed into any desired shape, e.g., a shape suitable for inclusion into the housing of a filtration device, which provides for fluid inflow and outflow, and which filtration device has one or more chambers for contact of the fluid with the purification material. Such a device forms another embodiment of the invention. In addition to maintaining the mineral and carbon particles immobilized in a unitary block, the polymeric binder also provides desirable physical characteristics to the filter material, e.g., rendering it rigid or flexible, depending upon the type and amount of polymeric binder used. In this embodiment the surfaces of the composite materials are modified with surface reactive compounds. As example, silane and siloxane containing compounds are capable of attaching many different polar, charged, and polymeric precursor chemical functionalities to a surface. This treatment process may be used before or after the filtration materials are immobilized by use of a binder. If surface reactive agents are used to modify the filtration materials after processing with a binder, then the binder may also be surface treated. The extent of this treatment depends upon the composition of the binder and the surface treatment reagent used. In this embodiment the composite material binder may also be surface modified before combination with the filtration material.

In one embodiment, the invention relates to a fluid treatment material that contains silicon oxide containing materials. Typically, at least a portion of these silicon oxides are in the form of glass or quartz. These minerals can be prepared from virgin materials or may have been obtained from recycling and reclamation efforts. Reduced metal may be present, and lower concentrations of other metal oxides that are used in the fabrication of the glass may be present. The various composites generated from these materials are contained in a porous vessel and allows fluid to pass therethrough. In this embodiment the surfaces of the composite materials are modified with surface reactive compounds. As example, silane and siloxane containing compounds are capable of attaching many different polar, charged, and polymeric precursor chemical functionalities to a surface. This treatment process may be used before or after addition of the filtration materials to a porous container. If surface reactive agents are used to modify the filtration materials after addition to a porous container, then the container may also be surface treated. The extent of this treatment depends upon the material composition of the container and the surface treatment reagent used.

In another embodiment, the invention relates to a fluid treatment material that contains silicon oxide containing materials. Typically, at least a portion of these silicon oxides are in the form of glass or quartz. These minerals can be prepared from virgin materials or may have been obtained from recycling and reclamation efforts. Reduced metal may be present, and lower concentrations of other metal oxides that are used in the fabrication of the glass may be present. Also typically, the binder is a polymeric or oligomeric material that is capable of maintaining the particulate, fiber, or combination thereof in a block structure. This allows the treatment material to be molded or pressed into any desired shape, e.g., a shape suitable for inclusion into the housing of a filtration device, which provides for fluid inflow and outflow, and which filtration device has one or more chambers for contact of the fluid with the purification material. Such a device forms another embodiment of the invention. In addition to maintaining the mineral and carbon particles immobilized in a unitary block, the polymeric binder also provides desirable physical characteristics to the filter material, e.g., rendering it rigid or flexible, depending upon the type and amount of polymeric binder used. In this embodiment the surfaces of the composite materials are modified with surface reactive compounds. As example, silane and siloxane containing compounds are capable of attaching many different polar, charged, and polymeric precursor chemical functionalities to a surface. This treatment process may be used before or after the filtration materials are immobilized by use of a binder. If surface reactive agents are used to modify the filtration materials after processing with a binder, then the binder may also be surface treated. The extent of this treatment depends upon the composition of the binder and the surface treatment reagent used. In this embodiment the composite material binder may also be surface modified before combination with the filtration material.

In another embodiment, the invention relates to a purification material for fluids that is in the form of a sheet or membrane, containing the particulate or fiber minerals including fluid treatment carbon, metal phosphates, metal oxides, reduced metals, silicates, metal sulfates, metal carbonates, silicates, metal hydroxides, or combinations thereof and carbon and immobilized with a binder. In this embodiment the surfaces of the composite materials are modified with surface treatment chemicals such as polymers containing electrical charges or reactive compounds such as silanes or siloxanes that are capable of attaching many different chemical functionalities to a surface before or after addition of the filtration materials are immobilized by use of a binder. If surface reactive agents are used to modify the filtration materials after processing with a binder, then the binder may also be surface treated. The extent of this treatment depends upon the composition of the binder and the surface treatment reagent used. In this embodiment the composite material binder may also be surface modified before combination with the filtration material.

In another embodiment, the invention relates to a purification material for fluids that is in the form of a block, sheet or membrane, containing the particulate minerals including fluid treatment carbon, metal phosphates, metal oxides, reduced metals, silicates, metal sulfates, metal carbonates, silicates, metal hydroxides, or combinations thereof and carbon and immobilized with a pressure-technique that uses fluid-swellable materials. In this embodiment the surfaces of the composite materials are modified with surface reactive compounds. As example, silane and siloxane containing compounds are capable of attaching many different polar, charged, and polymeric precursor chemical functionalities to a surface. This treatment process may be used before or after the filtration materials are immobilized by use of a binder. If surface reactive agents are used to modify the filtration materials after processing with a binder, then the binder may also be surface treated. The extent of this treatment depends upon the composition of the binder and the surface treatment reagent used. In this embodiment the composite material binder may also be surface modified before combination with the filtration material.

In another embodiment, the invention relates to a purification material for fluids that is in the form of a block, sheet or membrane, containing the particulate minerals including fluid treatment carbon, metal phosphates, metal oxides, reduced metals, silicates, metal sulfates, metal carbonates, silicates, metal hydroxides, or combinations thereof and particulate, fiber, wire, or combinations thereof of copper and copper alloys (eg. brass) or iron and iron alloys or a combination thereof and immobilized with either a thermoplastic binder or with a pressure-technique that uses as example a fluid-swellable material. In this embodiment the surfaces of the composite materials are modified with surface reactive compounds. As example, silane and siloxane containing compounds are capable of attaching many different polar, charged, and polymeric precursor chemical functionalities to a surface. This treatment process may be used before or after the filtration materials are immobilized by use of a binder. If surface reactive agents are used to modify the filtration materials after processing with a binder, then the binder may also be surface treated. The extent of this treatment depends upon the composition of the binder and the surface treatment reagent used. In this embodiment the composite material binder may also be surface modified before combination with the filtration material.

The invention also relates to methods of filtering fluids, such as water, aqueous solutions, and gases, to convert/reduce a large proportion of one or more types of chemical species contained therein, by contacting the fluid with the purification material of the invention. In a particular aspect of this embodiment of the invention, this contacting occurs within the device described above, with the unfiltered fluid flowing through an inlet, contacting the purification material in one or more chambers, and the filtered fluid flowing out of the chamber through an outlet.

The purification material of the invention can be used to purify drinking water, to purify water used for recreational purposes, such as in swimming pools, hot tubs, and spas, to purify process water, e.g. water used in cooling towers, to purify aqueous solutions, including but not limited to, fermentation broths and cell culture solutions (e.g., for solution recycling in fermentation or other biotechnology processes) and aqueous fluids used in surgical procedures for recycle or reuse, and to purify gases and mixtures of gases such as breathable air, for example, air used to ventilate hospital or industrial clean rooms, air used in diving equipment, or air that is recycled, e.g., in airplanes or spacecraft, and gases used to sparge, purge or remove volatile or particulate matter from surfaces, containers, or vessels. The purification material of the invention has the additional advantage of making use of readily available mineral materials, including those obtained from natural or recycled sources, readily available surface treatment chemicals, while still maintaining high purification efficiency.

In a preferred embodiment of the invention the composites of the invention are used to treat fluids prior to treatment with membrane, coagulation, precipitation, flocculation, or ion-exchange fluid treatment techniques or methods.

In yet another embodiment of the invention, the material of the invention, namely minerals and optionally other adsorptive and buffering materials in a binder matrix and formed into a block or sheet and surface modified by surface reactive reagents, can be used as a medium for converting chemical species used in biotechnology applications such as fermentation processes and cell culture and in semiconductor operations. In this embodiment, biological process fluids, such as nutrient broths, substrate solutions, and the like, are passed through the treatment material of the invention in a manner that allows the fluids to come into contact with the chemical species immobilized therein (eg. enzymes), and effluent removed from the material and further processed as needed.

BRIEF DESCRIPTION OF THE DRAWINGS

FIG. 1 is a cross-sectional view illustrating a particular embodiment of the invention, namely a water filter housing containing a block filter incorporating, metal phosphates, metal oxides, reduced metals, metal silicates, metal sulfates, metal carbonates, metal hydroxides, or combinations thereof along with granulated activated charcoal (GAC) in a binder matrix according to the invention. A surface reactive silane reagent was used to modify the surface of all materials.

FIGS. 2a and 2b are schematic views of a particular embodiment of the invention, namely a filter material containing complex mixtures of fluid treatment carbon, metal phosphates, metal oxides, reduced metals, metal silicates, metal sulfates, metal carbonates, metal hydroxides, or combinations thereof and a binder matrix in the form of a membrane or sheet. A surface reactive silane reagent was used to modify the surface of all materials.

DETAILED DESCRIPTION OF THE INVENTION

As indicated above, one embodiment of the invention includes a composite of loose particulate, fiber or combinations thereof of fluid treatment carbon, metal phosphates, metal oxides, silicates, metal sulfates, metal carbonates, silicates, metal hydroxides, or combinations thereof housed in a porous container that allow fluid passage therethrough. In this embodiment the loose particulate material and the container is treated with a surface reactive reagent that yields a surface attached chemical species.

A more preferred embodiment of the invention relates to a purification material in the form of a block filter containing fluid treatment carbon, metal phosphates, metal oxides, silicates, metal sulfates, metal carbonates, silicates, metal hydroxides, or combinations thereof in a binder, which is typically a polymeric material. In a particular aspect of this embodiment, the invention relates to a block filter that contains a mixture of granulated phosphate minerals, silicates, iron in oxide, hydroxide, or reduced metal form or a combination thereof and granulated activated charcoal (GAC) or bone charcoal or other adsorptive filter media in a binder material, such as a thermoplastic or fluid swellable material, such that the mineral derivatives and GAC and/or bone charcoal are fixed within the binder matrix, and that channeling from flow during water treatment cannot occur. In this particular aspect of the embodiment all materials including the binder are treated with a surface reactive reagent that yields a surface attached chemical species.

In another particular aspect of this embodiment, the invention relates to a rigid block filter that contains a mixture of silicate minerals and aluminum oxides, titanium oxides, iron oxides, or combinations thereof and granulated activated charcoal (GAC) or bone charcoal or other adsorptive filter media in a binder material, such as a thermoplastic material or fluid swelling material, such that the silicate and aluminum, iron and titanium containing minerals and derivatives and GAC and/or bone charcoal are fixed within the binder matrix, and that channeling from flow during water treatment cannot occur. In this particular aspect of the embodiment all materials including the binder are treated with a surface reactive reagent that yields a surface attached chemical species.

In another particular aspect of this embodiment, the invention relates to a rigid block filter that contains a mixture of silica materials from either natural or recycled sources or a combination thereof, and granulated activated charcoal (GAC) or bone charcoal or other adsorptive filter media in a binder material, such as a thermoplastic material or fluid swelling material, such that the silica and derivatives (glass) and GAC and/or bone charcoal are fixed within the binder matrix, and that channeling from flow during water treatment cannot occur. In this particular aspect of the embodiment all materials including the binder are treated with a surface reactive reagent that yields a surface attached chemical species.

In another particular aspect of this embodiment, the invention relates to a rigid block filter that contains a mixture of silica materials from either natural or recycled sources or a combination thereof, in a binder material, such as a thermoplastic material or fluid swelling material, such that the silica and derivatives (glass) are fixed within the binder matrix, and that channeling from flow during water treatment cannot occur. In this particular aspect of the embodiment all materials including the binder are treated with a surface reactive reagent that yields a surface attached chemical species.

The purification materials of the invention can be produced by extrusion, molding including injection molding, or by compression methods including the use of swellable materials. Fibrillation may also be used to prepare fibrils of the mixture of binder polymer and minerals that can then be formed into a sheet, film, or block. It may be produced in any shape or size and may be rigid or flexible. Pressure techniques which use fluid swelling materials may also be used to prepare the mixture of binder, fluid treatment carbon, metal phosphates, metal oxides, reduced metals, metal silicates, metal sulfates, metal carbonates, metal hydroxides, or combinations thereof that can then be formed into a sheet, film, or block. It may be produced in any shape or size and may be rigid or flexible.

The pore size of the filter block influences flow rates of the fluid through the filter, and is a function of the size of the granular particles incorporated into the filter block. As used herein, the term "block" does not denote any particular geometrical shape, but rather that the material is not a sheet or membrane. Non-limiting examples of "blocks" as this term is intended to be used include tubes, annular rings, as well as more conventional geometrical solids. Material formed into flexible blocks is particularly suitable for use in pipes or tubes that serve as the fluid filter medium.

One of the desirable features of the purification material of the invention is that it may be formed into any desired shape, and thus provides ease of handling and use. For example, the purification material may be formed into a monolith or block that fits into conventional housings for filtration media or it can be shaped to provide purification as part of a portable or personal filtration system. Alternatively, the material may be formed into several different pieces, through which water flows in series or in parallel. Sheets or membranes of the purification material may also be formed. The rigidity of the purification material, whether in block form or in sheet/membrane form, may be altered through inclusion of flexible polymers in the binder material.

While not wishing to be bound by any theory, it is believed that several of the preferred embodiments purification material of the invention achieves the unusually high efficiency in converting/removing contaminants from fluids partly as the result of the immobilization of the surface treated mineral and carbon particles in the binder, and the necessity for fluid flowing through the purification material to follow an extended and tortuous path therethrough, instead of forming channels through the purification material as occurs in loose particulate purification materials. This path ensures that the fluid contacts a larger proportion of the surface area of the mineral particles, and it prevents sustained laminar flow of the fluid through the filtration material. This latter effect is believed to help prevent laminae of fluid containing arsenic and other contaminants from avoiding sustained contact with mineral particles in the filter. After the purification material has been in service for a period of time, additional contact time generated by particle occlusion will occur as particulate material accumulates in the pores of the purification material.

Those familiar with the art of fluid filtration will understand that the pore size and physical dimensions of the purification material may be manipulated for different applications and that variations in these variables will alter flow rates, back-pressure, and the level of chemical and microbiological contaminant removal.

Likewise those knowledgeable in the art will recognize that variations in the percentages of each component of the purification material will provide some variability in utility. For example, increasing the percentage of carbon in the purification material will result in a material having an increased capacity for chlorine removal, while increasing the percentage of binder will result in a purification material having material and mechanical properties closer to that of the binder material and with reduced chemical reaction capacity.

In one particular embodiment of the invention, the complex mineral mixture is derived from the processing of animal bones (bone charcoal) and the processing of natural materials to generate a GAC material. The bone charcoal, which is a complex mixture after processing of phosphates, sulfates, carbonates, silicates, and sometimes reduced metals and the GAC are present in approximately equal amounts, with the percentage of binder material kept to a minimum. However, the mineral mixture used in the invention may be generated or obtained from other natural or synthetic/industrial sources and mixtures of the different derivatives can provide differences in the properties of the purification material. For example, adding calcium carbonate to the filter block can decrease the acid concentration in the effluent water if water is used as the fluid. This can be useful in, e.g. neutralizing acidic water in such a way as to maintain desirable water pH levels therein. The carbonate species in the filter material may be obtained either by inclusion of alkali and alkaline earth salts or metal based salts such as those containing titanium, manganese iron, or combinations thereof inclusion of other carbonate salts and compounds, or by pre-conditioning the purification material by passing reactive carbonate-containing solutions therethrough.

Likewise, as the number of interaction sites in the composites are increased through the use of different particle sizes, distributions, structural forms and orientation of different crystal faces, the reaction and binding of metal ions and compounds, radioactive isotopes, and microorganisms can also be modified. Commonly, exposure to increased temperatures allows conversion between crystalline and amorphous forms. Commonly, exposure to metals in a synthesis procedure allows replacement of some of the metal ions in both crystalline and amorphous forms. In many cases, unstable mineral forms slowly convert to more stable forms. Examples include the structural changes that are known to occur in calcium phosphates, iron oxides, aluminum oxides, manganese oxides, and glasses.

Those experienced in the art will also understand that many different structural forms including different crystal or amorphous lattices are possible for many minerals. Minerals containing iron-aluminum, oxides of manganese, and for other adsorbent materials used in the invention, and that these variations will yield differences in properties of the resulting purification material, as certain structural structures improve and inhibit interactions with chemicals, microorganisms and other biological species. These differences in properties result from differences in interactions between the chemical ions and compounds, microorganisms and other biological species and the different reactive sites that are associated with the fluid treatment carbon, metal phosphates, metal oxides, reduced metals, metal silicates, metal sulfates, metal carbonates, and metal hydroxides' surface.

Those experienced in the art will also understand that different chemical and biological reactions can occur when these materials are place in fluids such as water which will change the composition. As example, the interaction of iron metal with water and salts can produce iron hydroxides and iron oxides in varying ratios and with iron in different oxidation states.

Furthermore, those experienced in the art will also understand that different mineral processing techniques such as milling, grinding, sieving, and screening can increase the concentration of reduced metals and oxide materials in the material undergoing processing and in some cases the final materials will have varying properties and that subsequent treatment with a surface active reagent will yield different levels of surface modification.

In another embodiment of the invention, the purification material is constructed to withstand sterilization. Sterilization processes include thermal processes, such as steam sterilization or other processes wherein the purification material is exposed to elevated temperatures or pressures or both, resistive heating, radiation sterilization wherein the purification material is exposed to elevated radiation levels, including processes using ultraviolet, infrared, microwave, and ionizing radiation, and chemical sterilization, wherein the purification material is exposed to elevated levels of oxidants or reductants or other chemical species, and which is performed with chemicals such as halogens, reactive oxygen species, formaldehyde, surfactants, metals and gases such as ethylene oxide, methyl bromide, beta-propiolactone, and propylene oxide.

Additionally, sterilization may be accomplished with electrochemical methods by direct oxidation or reduction with microbiological components or indirectly through the electrochemical generation of oxidative or reductive chemical species. Combinations of these processes are also used on a routine basis. It should also be understood that sterilization processes may be used on a continuous or sporadic basis while the purification material is in use.

In general, the invention comprises a device and a method for the filtration and purification of a fluid, in particular an aqueous solution or water, to remove biological, organic and inorganic compounds, particulates and elements present in the fluid. In particular, the device and method can be used to remove and/or convert chemical and microbiological contaminants, including heavy metals such as arsenic, bacteria, and viruses and components thereof, from water or other fluids or gasses destined for consumption or other use by humans or other animals. The method and device of the invention are particularly useful in these applications where the reduction in concentration of chemical and microbiological contaminants made possible by the invention meets WHO and EPA standards for water purification devices, and also exceeds the effectiveness of other known filtration and purification devices incorporating granulated adsorption media that contain phosphate, iron, calcium, magnesium, silicon, manganese and aluminum containing minerals, such as those obtained fluid treatment carbon, metal phosphates, metal oxides, reduced metals, metal silicates, metal sulfates, metal carbonates, metal hydroxides, or combinations thereof. In a particular embodiment of the invention, the purification material is a porous block formed by granulated or particulate fluid treatment carbon, metal phosphates, metal oxides, reduced metals, silicates, metal sulfates, metal carbonates, silicates, metal hydroxides, or combinations thereof and other optional adsorptive granular materials, described in more detail below, such as ion-exchange resins, retained within a polymer binder matrix. In the method corresponding to this particular embodiment, the chemical and microbiological contaminants are removed from the water when the water is forced through the porous block by water pressure on the influent side, or by a vacuum on the effluent side, of the filter block.

In an embodiment of the invention where the purification material is composed of a mixture fluid treatment carbon, metal phosphates, metal oxides, reduced metals, silicates, metal sulfates, metal carbonates, silicates, metal hydroxides, or combinations thereof, such components can be dispersed in a random manner throughout the block. The purification material can also be formed with spatially distinct gradients or separated layers. For example, iron and phosphate containing minerals and fluid treatment carbon may be immobilized in separate layers using a solid binder matrix, for instance, a polymer thermoplastic such as polyethylene or the like or through pressure techniques using fluid swellable materials, so that movement of the mixture particles is precluded and detrimental channeling effects during fluid transport through the block are prevented. If the components reside in separate locations, the fluid flow is sequential through these locations. In a particular example of this embodiment, at least a portion of the fluid treatment carbon, metal phosphates, metal oxides, reduced metals, silicates, metal sulfates, metal carbonates, silicates, metal hydroxides, or combinations thereof are in varying ratios. Examples of suitable material mixtures can be obtained from naturally occurring mixtures such as those designated as Natural Charcoal and sold by Brimac Carbon Services, as calcined bauxite as sold by CE Minerals, as magnesium silicate as sold by R. T Vanderbilt company, silica such as that sold by US Silica Company, and whole or milled fibers such as that sold by Owens Coming. The minerals in these mixtures may be ground to a desirable particle size, e.g., 80–325 mesh or smaller. A typical analysis of these materials shows 50% or greater calcium phosphate, aluminum oxide, magnesium silicate, or silica, respectively and less than 50% iron metal oxides, mixed phosphates, silicates, titanium oxides, or manganese oxides. The inorganic and organic ion and compound binding characteristics of these materials have been reported by producers of these raw materials.

In this embodiment, the complex mineral mixtures containing, metal phosphates, metal oxides, reduced metals, silicates, metal sulfates, metal carbonates, silicates, metal hydroxides, or combinations thereof in varying ratios and the fluid treatment carbon are mixed in approximately equal amounts with the minimal amount of binder material necessary to compose a monolithic purification material. However, the concentrations of the mineral mixture and GAC, and binder are substantially variable, and materials having different concentrations of these materials may be utilized in a similar fashion without the need for any undue experimentation by those of skill in the art.

In general, however, when ion-exchange materials are used as the additional adsorbent material, its concentration in the mixture is generally less than 50% by weight, based upon the weight of the composition before any drying or compacting. Examples of these adsorbents include various ion-binding materials, such as synthetic ion exchange resins, zeolites (synthetic or naturally occurring), diatomaceous earth, and metal silicate materials and one or more other phosphate-containing materials, such as minerals of the phosphate or oxide class, in particular, minerals containing copper, zinc, iron, aluminum, manganese, and titanium, described herein.

In particular, mineral compositions containing high concentrations of calcium phosphates, aluminum silicates, iron oxides, manganese oxides, and silica with lower concentrations of calcium carbonates and calcium sulfates are suitable materials for the invention. These materials may be calcined and processed by a number of methods to yield mixtures of varying compositions.

Minerals containing iron metal which undergo processing usually result in chemical forms such as those found in the hydroxide and oxide classes. As example iron may be found in the form of the reduced metal ($Fe^0$), as a hydroxide/oxide mixture commonly referred to as ferric hydroxide ($Fe(OH)_3$), hydrous ferric oxides, ferrihydrite, ($Fe_2O_3 \cdot xH_2O$), lepidocrocite (gamma-FeOOH), goethite (alpha-FeOOH), beta-FeOOH, maghemite (gamma-$Fe_2O_3$), and hematite (alpha-$Fe_2O_3$). Naturally occurring iron silicate mixtures include the green sands which contain the mineral glauconite.

Minerals containing phosphate include those with the apatite crystal structure and monocalcium phosphate, dicalcium phosphate, and octacalcium phosphate. It should be noted that these minerals have varying solubilities. Additionally minerals containing both iron and phosphate are exemplary.

Minerals containing manganese include those in the oxide and hydroxide classes. In most cases the formula $MnO_x$, where x varies between the value one and two. Raw ores known as pyrolusite and psilomelane are common starting sources. As example a metallurgical grade ore contains 48–50% manganese, 4–5% iron, 9–12% silica, less than 1% alumina, and less than 1% phosphorus.

Minerals containing aluminum include those in the oxide and silicate class. Specifically, minerals containing alumina are exemplary examples as are those that are considered zeolites.

Minerals and materials containing silica are exemplary. Specifically, silica can be obtained from mining operations, the processing of plant, algae and animal materials, and in processed forms such as glass. More specifically, silica or silicon dioxide is a major component of sand, quartz, diatomite, chert, agate, chalcedony, amorphous opal, and what is known as silica sand. Processed plant and algae materials such as rice hulls, and diatoms generate silica. Raw silica is used to prepare glass in many forms including sheet, fiber, and complex objects. The porosity of glass fibers and particles can often be controlled as in controlled pore glass (CPG). Milled fibers and spun wound fibers are exemplary. In some cases these materials may be used as prepared and in other cases recycled forms where grinding, milling, and chemical treatment have occurred provide exemplary materials for the invention.

Those experienced in the art will understand that glass composition is highly variable and that specialty glasses for specific applications such as biological use (bioglasses), high temperature use, electronic use, and consumer use are widely available. Those experienced in the art will also understand that crystalline silica and molecular glass structures are available and that processing conditions can change these structures. All of these glass forms and including crystalline forms are included in the spirit of the invention.

Surface treatment of the minerals described previously and derivatives of these inorganics and the containers and binders that either contain or immobilize the particles are varied and many are widely available. Specifically, exemplary surface treatment reagents include the monomers and polymers generated from silanes and siloxanes, polymers used in flocculating particulates in wastewater, sizing or fiber coating agents as used in fiberglass and pulp and paper processing. Specifically, silane compounds sold by companies such as United Chemical Technologies, and include many reagents that yield different surface functionalities. Exemplary functionalities include those which are polar, cationic, or elements that can obtain positive charges and those which are reactive which allow further reaction and placement of polar, cationic or elements which can obtain positive charges.

Exemplary examples include 3-acryloxypropylotrichlorosilane, 3-acrlyoxypropylotrimethocysilane, Allyltrichlorosilane, allyltrimethoxysilane, allyltriethoxysilane, 3-bromopropylotrichlorosilane, 3-bromopropylotrimethoxysilane, (p-chloromethyl) phenyltrichlorosilane), (p-chloromethyl) phenyltrimethoxysilane, 1-trimethoxysilyl-2-2(p,m-chloromethyl)-phenylethane, chloromethyltrichlorosilane, chloromethyltriethoxysilane, 2-chloroethyltriethoxysilane, 3-chloropropyltrichlorosilane, 3-chloropropyltrimethoxysilane, 3-glycidoxypropyltrimethoxysilane, 3-iodopropyl trimethoxysilane, 3-isocyanatopropyltriethoxysilane, 2-(diphenylphosphino) ethyltriethoxysilane, vinyltriacetoxysilane, vinyltrichlorosilane, vinyltriethoxysilane, vinyltrimethoxysilane, 3-mercaptopropyltrimethoxysilane, 3-mercaptopropyltriethoxysilane, N-(triethoxysilylpropyl) urea, 3-aminopropyltriethoxysilane, 3-aminopropyltrimethoxy silane, N-(2-aminoethyl)-3-aminopropyltrimethoxysilane, 2-(carbomethoxy) ethyltrichlorosilane, N-[(3-trimethoxysilyl)propyl] ethylenediamine triacetic acid, trisodium salt, 3-cyanopropyltrichlorosilane, 3-cyanopropyltriethoxysilane, 2-(4-chlorosulfonylphenyl) ethyltrichlorosilane, 2-(4-chlorosulfonylphenyl) ethyltrimethoxysilane, 2-(trimethoxysilyl) ethyl-2-pyridine, N-(3-trimethoxysilylpropyl)pyrrole, N-octadecyldimethyl-1 (3-trimethoxysilyl)propyl]ammoniumchloride, N-trimethoxysilylpropyl-n,n,n-trimethyl ammoniym chloride, 3-(trimethoxysilyl) propyldimethyloctadecylammonium chloride silane quaternary amine, chloropropyl trihydroxy silane. Reactive siloxane compounds are manufactured by companies such as Dow Chemical.

Those experienced in the art will understand that numerous other derivatives of silane compounds and siloxane compounds are possible and that the reaction and curing conditions for these surface reactive chemicals vary with respect to surface and environmental conditions. It should also be understood that surface coverage can be controlled and tuned over a wide range and that this coverage is also related to surface characteristics and treatment conditions. Further it should be understood that multilayer assemblies of molecules and polymers can be generated on the surface and extending away from the surface when surface treatments are conducted. Further, it should be understood that additional chemical and biological species can be accommodated on the filtration material surface. As example polyelectrolytes, polymers, microorganisms, components of cells and microorganisms, enzymes, and chelating agents can be attached. Furthermore it should be understood that method of invention and the resulting composites obtain their unique function by providing a range of surface interaction sites. These sites provided by the surface of the filtration media, binders, and containers, as well as the surface treatment reagents that provide different interaction sites on the filtration media, binders, and containers.

Polymeric materials used for ion-binding including derivatised resins of styrene and divinylbenzene, and methacrylate may be used. The derivatives include functionalized polymers having anion binding sites based on quaternary amines, primary and secondary amines, aminopropyl, diethylaminoethyl, and diethylaminopropyl substituents. Derivatives including cation binding sites include polymers functionalized with sulfonic acid, benzenesulfonic acid, propylsulfonic acid, phosphonic acid, and/or carboxylic acid moieties. Natural or synthetic zeolites may also be used or included as ion-binding materials, including, e.g., naturally occurring aluminosilicates such as clinoptilolite and calcium silicates such as wollastonite.

Suitable binder materials include any polymeric material capable of aggregating the particulate materials together and maintaining this aggregation under the conditions of use. They are generally included in amounts ranging from about 1 wt % to about 99.9 wt %, more particularly from about 1 wt % to about 50 wt %, based upon the total weight or volume of the purification material. Suitable polymeric materials include both naturally occurring and synthetic polymers, as well as synthetic modifications of naturally occurring polymers. The polymeric binder materials generally include one or more thermoset, thermoplastic, elastomer, or a combination thereof, depending upon the desired mechanical properties of the resulting purification material. U.S. Pat. Nos. 6,187,192 and 6,180,016 describe suitable polymers and are herein included in their entirety by reference.

Material binders may also be chosen from those classes of materials which swell through fluid absorption. These materials include crosslinked polymers such as synthetically produced polyacrylic acids, and polyacrylamides and naturally occuring organic polymers such as celluloses. Minerals and clays which swell with fluid absorption include smectite and montmorillinite clays. Examples include bentonite and derviatives. These swellable materials immobilize the mineral particulates or fibers through pressure techniques.

Material binders may also be chosen from those classes of materials which react during of after fabrication processes. Examples include polyethylenes that have been synthesized or modified by further chemical reaction to contain peroxides, azo compounds, and silanes. Other reactive binders include those based on lactones such as e-caprolactone, and mixtures of lactones and polyolefins. Those knowledgeable in the art will understand that processing conditions including temperature, moisture content and exposure characteristics, chemical functionality of the base polymer, and irradiation processes can all be used to modify the degree and extent of reaction. Further, it should be understood that crosslinking between binder molecules is possible as well as between filtration materials, and between binder molecules and filtration materials. The degree and extent of the crosslinking or reaction determined by reaction conditions and the identity of the participating species. Furthermore, it should be understood that end properties of the composites will be a function of the extent of reaction between filtration media, binders, containers, and reactive surface treatments. Examples include better thermal stability, chemical resistance, and filtration capacity.

In the specific embodiment where additional molecules may be used before or after surface treatment of the filtration media, containers, and binders exemplary examples are those compounds used in flocculating and coagulation in fluid treatment applications, compounds used as sizings and coatings in both the inorganic fiber processing industries and the pulp and paper industries. Examples of these compounds include: polyamides, polyalcohols, polysaacharides, polyacrylamides, polyacrylates, humic acids, peptides, proteins, polorganozirconates, polyorganoaluminates, polysiloxanes, polysilanes, polysilazanes, polycarbosilanes, polyborosilanes, zirconium dimethacrulate, zirconium tetramethacrylate, zirconium 2-ethylhexanoate, aluminum butoxides, aluminum diisopropoxide ethylacetoacetate, tetramethyldisiloxanes and derivatives thereof, tristrimethylsilylphosphate and tristrimethylsiloxyboron. Polyelectrolytes carrying positive or negative charged chemical functionalities, or a combination thereof are exemplary. These may include but are not limited to polyamines such as poly(DADMAC), poly-DADM, polyamine-poly(DADMAC) blends, polyquartenary amines, inorganic-polyamine blends, and inorganic poly(DADMAC) blends. Additionally, cationic starch, and cationic polymethylmethacrylates may be used. Also, copolymers of vinylimidazolium methochloride and vinylpyrrolidone, quarternized vinylpyrrolidone/dimethyl-aminoethyl-methacrylate copolymer, and polyethyleneimine. Companies manufacturing suitable materials include Vinings Industries, Cytec, BASF Corporation, Ontario Specialty Coatings Corp., International Specialty Products, and EKA Chemicals.

In the specific embodiment of a filter material that may be sterilized the mineral mixture and the fluid treatment carbon are present in approximately equal amounts, with the percentage of binder material kept to a minimum. The binder used must be stable to the temperature, pressure, electrochemical, radiative, and chemical conditions presented in the sterilization process, and should be otherwise compatible with the sterilization method. Examples of binders suitable for sterilization methods involving exposure to high temperatures (such as steam sterilization or autoclaving) include cellulose nitrate, polyethersulfone, nylon, polypropylene, polytetrafluoroethylene (teflon), crosslinked polyethylene, and mixed cellulose esters. Purification materials prepared with these binders can be autoclaved when the binder polymers are prepared according to known standards. Desirably, the purification material is stable to both steam sterilization or autoclaving and chemical sterilization or contact with oxidative or reductive chemical species, as this combination of sterilizing steps is particularly suitable for efficient and effective regeneration of the purification material. Additionally, sterilization and regenerating of devices incorporating the magnesium containing mineral materials may be conducted by passing solutions of salt, acid, and/or caustic solutions through the filter.

In the embodiment of the invention wherein sterilization is at least in part conducted through the electrochemical generation of oxidative or reductive chemical species, the electrical potential necessary to generate said species can be attained by using the purification material itself as one of the electrodes. For example, the purification material, which contains polymeric binder, can be rendered conductive through the inclusion of a sufficiently high level of conductive particles, such as granular activated carbon, carbon black, or metallic particles to render a normally insulative polymeric material conductive. Alternatively, if the desired level of carbon or other particles is not sufficiently high to render an otherwise insulative polymer conductive, an intrinsically conductive polymer may be used as or blended into the binder. Examples of suitable intrinsically conductive polymers include doped polyanilines, polythiophenes, and other known intrinsically conductive polymers. These materials can be incorporated into the binder in sufficient amount to provide a resistance of less than about 1 k$\Omega$, more particularly less than about 300$\Omega$.

The purification material of the present invention need not be in the form of a block, but may also be formed into a sheet or film. This sheet or film may, in a particular embodiment, be disposed on a woven or nonwoven web of, e.g., a polymer. The polymer used to form the woven or nonwoven web may be any thermoplastic or thermosetting resin typically used to form fabrics. Polyolefins, such as polypropylene and polyethylene are particularly suitable in this regard.

The efficiency of the purification material and the method for using it to reduce microbiological and chemical contaminants and the flow rate of the fluid through the material, are a function of the pore size within the block and the influent fluid pressure. At constant fluid pressure, flow rate is a function of pore size, and the pore size within the block can be regulated by controlling the size of the magnesium mineral and GAC granules. For example, a large granule size provides a less dense, more open purification material which results in a faster flow rate, and small granule size provides a more dense, less open purification material which results in a slower flow rate. A block formed with relatively large magnesium mineral granules will have less surface area and interaction sites than a block formed with smaller granules. Accordingly, the purification material of large granules must be of thicker dimension to achieve equal removal of microbiological contaminants. Because these factors are controllable within the manufacturing process, the purification materials can be customized by altering pore size, block volume, block outer surface area, and geometric shape to meet different application criteria. Average pore size in a particular embodiment is kept to below several microns, and more particularly to below about one micron, to preclude passage of cysts. It should be noted that the pore size described herein does not refer to the pores within the mineral or other adsorbent or absorbent particles themselves, but rather to the pores formed within the purification material when the particles are aggregated together by the binder.

In one of the preferred embodiments for making the purification material of the invention, in its most general aspect, involves treating the particulate media with the surface treatment reagent and then combining the particulate containing minerals (and optional surface treatment of the binder material(s) or use of a binder that has been prepared with a surface active functionality) with the binder material under conditions of pressure and temperature that allow at least a portion of the binder to be present in liquid form and that allow for compaction of the particulate, and then solidifying the binder around and/or between the particles. The precise nature of the production process will depend to a certain extent upon the nature of the binder material. It is also noted that this production process may also allow for curing or setting of the reactive surface agent.

For example, if the binder material is supplied in the form of a liquid solution, suspension, or emulsion (e.g., in a volatile solvent), it may be contacted with the particles by dipping or spraying, and the wet particles compressed in a mold. The mold may be optionally heated to evaporate any necessary solvent. The resulting molded material is then dried to form the purification material of the invention.

If, on the other hand, the binder is a polymer resin, it will typically be mixed in pellet form with the particles of the adsorbent material, and the resulting mixture heated and extruded or molded into the desired shape. Examples of suitable particulate/binder extrusion processes and equipment are disclosed in U.S. Pat. Nos. 5,189,092; 5,249,948; and 5,331,037. Other extrusion equipment and processes may also be used. Moreover, the mixture may be heated and injection molded, without the need for any extrusion. Additionally, the binder, a thermoset, may be generated through a crosslinking process that incorporates initiation by chemical processes, electrochemical processes, irradiation and through physical parameters of temperature and pressure variations.

In another of the preferred embodiments for making the purification material of the invention, in its most general aspect, involves treating the final composite purification media prepared with either loose particulate media or with immobilized particulate media do to the presence of a binder (and optional binder that has been prepared with a surface active functionality) with the surface reactive agent. This process can involve flow of a fluid containing the surface reactive agent through the composite material. This process may also involve subsequent curing or setting of the surface active agent, as example, by heat treatment.

With reference to the drawings, the invention and a mode of practicing it will now be described with regard to one particular embodiment, which meets the EPA and WHO requirements for drinking water filters. FIG. 1 illustrates a typical specific embodiment of a filtration apparatus containing the purification material of the invention, which incorporates a rigid porous block filter. A removable housing 11 is mated with a cap 12, the cap 12 having an inflow orifice 13 and an outflow orifice 14. A water supply conduit 15 is joined to the inflow orifice 13 to deliver non-treated water into the device, and a water discharge conduit 16 is joined to the outflow orifice 14 to conduct treated water from the device. Water passes into the housing 11. The pressure of the water flow forces it through the porous block filter 17, which as shown is formed in the shape of hollow cylinder with an axial bore 18. The treated water then passes into the axial bore 18 which connects to the outflow orifice 14. FIG. 1 is provided as a representative illustration of one possible configuration. It is to be understood that other configurations where water is caused to pass through a porous filter block 17 (which may have different geometrical shapes and/or different flow properties) are contemplated to be within the scope of the invention. The block 17 may be formed by any of a number of known methods, such as by extrusion, compression, molding, sintering, material swelling pressure or other techniques.

FIG. 2 shows two embodiments where the purification material of the invention is used in the form of a sheet or film. FIG. 2a shows purification material 1 used in connection with normal flow-through filtration, indicated by arrow 2, which represents the fluid being filtered by passage through the sheet or film 1. FIG. 2b shows purification material 1 used in connection with crossflow filtration. Fluid flowing across the filter is indicated by double-headed arrow 3, while fluid flowing through the purification material 1 is indicated by arrow 2. The cross flow fluid indicated by arrow 3 sweeps across the surface of the purification material 1, decreasing the level of particulate matter deposited thereon.

EXAMPLE 1

A cylindrical filter block 17 of the shape shown in FIG. 1 may be prepared with a material composition of approximately 42.5% bone charcoal obtained from Brimac Carbon Industries, approximately 42.5% GAC obtained from KX Industries, and approximately 15% thermoplastic binder material selected from one or more of the thermoplastics described above. This bone charcoal includes a mineral mixture that contains varying amounts of metal phosphates including iron, metal silicates, metal sulfates including calcium, metal carbonates including calcium, metal hydroxides, or combinations thereof.

The material may then be extruded at a temperature that provides a uniform mixture of bone charcoal, GAC, and thermoplastic binder. After extrusion and final preparations a fluid containing a reactive silane (APS) is passed through the composite. The cylindrical or toroidally shaped block 17 is approximately 9.8 inches in length, with an outer diameter of approximately 2.5 inches and an inner diameter (the bore 18) of approximately 1.25 inches.

This shape filter fits into a standard water filtration housing used in the home and industrial settings. The filter material has a resistance of about 300Ω.

EXAMPLE 2

The composite prepared in Example 1 may be used to reduce a water soluble chlorine species such as hypochlorous acid in an oxidized state to a chlorine species in a reduced state (choride). The following water parameters were used for testing: total dissolved solids 280–290 mg/L; total organic carbon 1.1 mg/L, pH=7.8–8.0, and chlorine 2.1 mg/L. This composite reduced greater than 90% of the hypochlorous acid. The composite maintained this function for more than 125 gallons of the test water.

EXAMPLE 3

The filter prepared in Example 1 may be challenged by exposing it to tap water that is filtered with activated carbon and then seeded with $2.3 \times 10^8$ colony forming units per liter of K. Terringena bacteria and $1.0 \times 10^7$ plaque forming units per liter of MS2. The seeded water is passed through the filter block 17 at a flow rate of approximately 2 liters/minute for 3 minutes, followed by collection of a 500 ml effluent sample. K. Terringena may be assayed on m-Endo agar plates by membrane filtration procedure, while the MS2 virus may be assayed by similar standard methods.

EXAMPLE 4

A cylindrical filter block 17 of the shape shown in FIG. 1 may be prepared with a material composition of approximately 42.5% calcined bauxite obtained from CE Minerals, approximately 42.5% GAC obtained from KX Industries, and approximately 15% thermoplastic binder material selected from one or more of the thermoplastics described above. This bauxite includes a mineral mixture that contains varying amounts of, silicates and metal oxides including aluminum, titanium, iron, or combinations thereof. The material may then be extruded at a temperature that provides a uniform mixture of bauxite, GAC, and thermoplastic binder. After extrusion and final preparations a fluid containing a reactive silane (APS) is passed through the composite. The cylindrical or toroidally shaped block 17 is approximately 9.8 inches in length, with an outer diameter of approximately 2.5 inches and an inner diameter (the bore 18) of approximately 1.25 inches. This shape filter fits into a standard water filtration housing used in the home and industrial settings. The filter material has a resistance of about 300Ω.

EXAMPLE 5

The composite prepared in Example 4 may be used to reduce a water soluble chlorine species such as hypochlorous acid in an oxidized state to a chlorine species in a reduced state (choride). The following water parameters were used for testing: total dissolved solids 280–290 mg/L;

total organic carbon 1.1 mg/L, pH=7.8–8.0, and chlorine 2.1 mg/L. This composite reduced greater than 90% of the hypochlorous acid. The composite maintained this function for more than 125 gallons of the test water.

EXAMPLE 6

The filter prepared in Example 4 may be challenged by exposing it to tap water that is filtered with activated carbon and then seeded with $2.3 \times 10^8$ colony forming units per liter of K. Terringena bacteria and $1.0 \times 10^7$ plaque forming units per liter of MS2. The seeded water is passed through the filter block 17 at a flow rate of approximately 2 liters/minute for 3 minutes, followed by collection of a 500 ml effluent sample. K. Terringena may be assayed on m-Endo agar plates by membrane filtration procedure, while the MS2 virus may be assayed by similar standard methods.

EXAMPLE 7

A cylindrical filter block 17 of the shape shown in FIG. 1 may be prepared with a material composition of approximately 85% silica obtained from US Silica, and approximately 15% thermoplastic binder material selected from one or more of the thermoplastics described above. After extrusion and final preparations a fluid containing a reactive silane (APS) is passed through the composite. The cylindrical or toroidally shaped block 17 is approximately 9.8 inches in length, with an outer diameter of approximately 2.5 inches and an inner diameter (the bore 18) of approximately 1.25 inches. This shape filter fits into a standard water filtration housing used in the home and industrial settings.

EXAMPLE 8

The filter prepared in Example 7 may be challenged by exposing it to tap water that is filtered with activated carbon and then seeded with $2.3 \times 10^8$ colony forming units per liter of K. Terringena bacteria and $1.0 \times 10^7$ plaque forming units per liter of MS2. The seeded water is passed through the filter block 17 at a flow rate of approximately 2 liters/minute for 3 minutes, followed by collection of a 500 ml effluent sample. K. Terringena may be assayed on m-Endo agar plates by membrane filtration procedure, while the MS2 virus may be assayed by similar standard methods.

As described above, the material of the invention is extremely useful in the area of water purification, particularly the area of drinking water purification. Because of the extremely high efficiency with which the material of the present invention reacts with components present in water it meets many of the EPA, WHO, and National Sanitation Foundation (NSF) guidelines for materials used as water treatment devices. In addition to functioning as a purifier for drinking water, the material of the invention can also be used to purify water used for recreational purposes, such as water used in swimming pools, hot tubs, and spas.

As the result of the ability of the material of the invention to efficiently react with chemical species such as chlorine in aqueous solutions, it has numerous applications in the food and beverage, pharmaceutical, and medical fields. For example, the material of the invention can be used in the preparation of pharmaceuticals and to purify fluids that contact physiological fluids such as blood.

The material can also be used in industrial fields where the manufacture of electronic and semiconductor components are conducted and in the treatment of fluids that result from mining activities.

In each of these applications, the method of using the material of the invention is relatively simple and should be apparent to those of skill in the filtration art. The fluid or gas to be filtered is simply conducted to one side of a block or sheet of material of the invention, typically disposed in some form of housing, and forced through the material as the result of a pressure drop across the purification material. Purified, filtered fluid or gas is then conducted away from the "clean" side of the filter and further processed or used.

The invention having been thus described by reference to certain of its specific embodiments, it will be apparent to those of skill in the art that many variations and modifications of these embodiments may be made within the spirit of the invention, which are intended to come within the scope of the appended claims and equivalents thereto.

What is claimed is:

1. A composite material for fluid treatment comprising:
   a fluid treatment media, wherein at least a portion of the fluid treatment media is treated with a surface modifyina aaent so as to yield additional contaminant interaction sites on the fluid treatment media; and
   a binder, wherein the composite material is in the form of a porous block or a sheet.

2. The composite material of claim 1, wherein the composite material is in the form of a porous block.

3. The composite material of claim 2, wherein the porous block is rigid.

4. The composite material of claim 1, wherein the composite material is in the form of a porous sheet.

5. The composite material of claim 4, wherein the porous sheet is rigid.

6. The composite material of claim 4, wherein the porous sheet is flexible.

7. The composite material of claim 1, wherein the composite material is housed in a porous support.

8. The composite material of claim 1, wherein at least a portion of the composite material is in a form selected from particles, fibers, or a combination thereof.

9. The composite material of claim 1, wherein at least a portion of the fluid treatment media is carbon.

10. The composite material of claim 9, wherein at least a portion of the carbon is activated.

11. The composite material of claim 9, wherein at least a portion of the carbon is obtained from bone charcoal.

12. The composite material of claim 1, wherein at least a portion of the fluid treatment media contains insoluble phosphate containing minerals selected from calcium phosphates, iron phosphates, manganese phosphates, aluminum phosphates, magnesium phosphates, magnesium phosphates, silver phosphates, copper phosphates, zinc phosphates, zirconium phosphates, or combinations thereof.

13. The composite material of claim 12, wherein at least a portion of the phosphate containing minerals comprise apatites.

14. The composite material of claim 12, wherein at least a portion of the calcium phosphates are selected from calcium monophosphates, diphosphates, tricalicum phosphates, octaphosphate, metaphosphates, or combinations thereof.

15. The composite material of claim 12, wherein at least a portion of the phosphate containing minerals are obtained from plant or animal sources.

16. The composite material of claim 15, wherein at least a portion of the phosphate containing minerals are obtained bone charcoal.

17. The composite material of claim 1, wherein at least a portion of the fluid treatment media contains metal oxides selected from aluminum oxides, iron oxides, magnesium oxides, calcium oxides, manganese oxides, zinc oxides, copper oxides, titanium oxides, silicon oxides, or combinations thereof.

18. The composite material of claim 17, wherein at least a portion of the metal oxides comprises alumina.

19. The composite material of claim 18, wherein at least a portion of the alumina is obtained from raw materials used to supply the aluminum industry.

20. The composite material of claim 19, wherein at least a portion of the raw materials used to supply the aluminum industry is selected from bauxite, kaoline, or a combination thereof.

21. The composite material of claim 17, wherein at least a portion of the iron oxide is in a form selected from amorphous hydrous ferric oxide, maghemite, hematite, goethite, lepidocrocite or mixtures thereof.

22. The composite material of claim 17, wherein at least a portion of the manganese oxide is obtained from pyrolusite.

23. The composite material of claim 22, wherein at least a portion of the manganese oxide is derived from reaction of a permanganate solution with the composite material.

24. The composite material of claim 17, wherein at least a portion of the metal oxides comprises silica.

25. The composite material of claim 17, wherein at least a portion of the metal oxides comprises quartz.

26. The composite material of claim 17, wherein at least a portion of the metal oxides comprises sand.

27. The composite material of claim 17, wherein at least a portion of the metal oxides comprises silica or quartz in fiber form.

28. The composite material of claim 27, wherein at least a portion of the metal oxides comprises silica or quartz in fiber form are wrapped or bundled.

29. The composite material of claim 27, wherein at least a portion of the silica is in a form selected from processed glass or quartz.

30. The composite material of claim 29, wherein at least a portion of the glass or quartz has undergone a recycling process.

31. The composite material of claim 17, wherein at least a portion of the metal oxides comprises silica obtained from plant or animal sources.

32. The composite material of claim 31, wherein at least a portion of the silica is obtained from diatoms.

33. The composite material of claim 31, wherein at least a portion of the silica is obtained from rice hulls, waste material, or combinations thereof.

34. The composite material of claim 1, wherein at least a portion of the fluid treatment media is a reduced metal selected from iron, copper, manganese, silver, gold, platinum, rhodium, zinc, or combinations thereof.

35. The composite material of claim 34, wherein at least a portion of the reduced metal is present in a form of an alloy and wherein the alloy includes a metal selected from iron, copper, zinc, carbon, chromium, manganese, nickel, or combinations thereof.

36. The composite material of claim 1, wherein at least a portion of the fluid treatment media is a silicate selected from aluminum silicate, iron silicate, manganese silicate, calcium silicate, magnesium silicate, or combinations thereof.

37. The composite material of claim 1, wherein at least a portion of the fluid treatment media contains a buffering agent selected from calcium carbonate, magnesium carbonate, iron carbonate, aluminum carbonate, or combinations thereof.

38. The composite material of claim 1, wherein at least a portion of the fluid treatment material is a metal hydroxide selected from aluminum hydroxide, iron hydroxide, magnesium hydroxide, calcium hydroxide, copper hydroxide, or combinations thereof.

39. The composite material of claim 1, wherein at least a portion of the fluid treatment material is natural fiber, string, or yarn.

40. The composite material of claim 39, wherein at least a portion of the natural fiber, string, or yarn is wrapped.

41. The composite material of claim 40, wherein at least a portion of the fluid treatment material is cotton or bleached cotton.

42. The composite material of claim 1, wherein at least a portion of the fluid treatment material is a fiber selected from polypropylene, rayon, polyester, nylon, acrylic, or combinations thereof.

43. The composite material of claim 1, wherein the composite material contains one or more of the individual components contained in phosphate rock.

44. The composite material of claim 1, wherein the binder is a polymer material.

45. The composite material of claim 44, wherein the binder is a polymer melting between about 50° C. and about 500° C.

46. The composite material of claim 44, wherein the polymer is stable under sterilization conditions.

47. The composite material of claim 44, wherein the binder is selected from thermoplastics, polyethylene glycols or a derivative thereof, polyvinyl alcohols, polyvinylacetate, polylactic acids, or combinations thereof.

48. The composite material of claim 47, wherein the thermoplastic is selected from nylon, polyethylene, polyvinylchloride, fluorocarbon resins, polystyrene, polypropylene, cellulosic resins, acrylic resins, or combinations thereof.

49. The composite material of claim 44, wherein the polymer material comprises a naturally occurring polymer.

50. The composite material of claim 49, wherein the naturally occurring polymer is selected from natural and synthetically modified celluloses, collagens, and organic acids.

51. The composite material of claim 44, wherein the polymer material comprises an electrically conductive polymer.

52. The composite material of claim 44, wherein the polymer material comprises a biodegradable polymer.

53. The composite material of claim 52, wherein the biodegradable polymer is selected from a polyethyleneglycol, a polylactic acid, a polyvinylalcohol, a co-polylactideglycolide, or combinations thereof.

54. The composite material of claim 1, wherein the binder is selected from gelling or absorbent polymers.

55. The composite material of claim 54, wherein the binder comprises a superabsorbent material.

56. The composite material of claim 55, wherein the binder is selected from polylactic acids, polyacrylamides or combinations thereof.

57. The composite material of claim 55, wherein said superabsorbent material comprises a material selected from polyacrylic acids, polyacrylamides, poly-alcohols, polyamines, polyethylene oxides, cellulose, chitins, gelatins, starch, polyvinyl alcohols and polyacrylic acid, polyacrylonitrile, carboxymethyl cellulose, alginic acids, carrageenans isolated from seaweeds, polysaccharides, pectins, xanthans, poly-(diallyldimethylammonium chloride), poly-vinylpyridine, poly-vinylbenzyltrimethylammonium salts, polyvinylacetates, polylactic acids, or combinations thereof.

58. The composite material of claim 55, wherein the superabsorbent material comprises a material selected from resins obtained by polymerizing acrylic acid or resins obtained by polymerizing acrylamide.

59. The composite material of claim 55, wherein the polymer material is selected from a naturally occurring polymer, cellulose, alginic acids, carrageenans isolated from seaweeds, polysaccharides, pectins, xanthans, starch, or combinations thereof.

60. The composite material of claim 55, wherein the naturally occurring polymer is selected from natural and synthetically modified celluloses, collagens, and organic acids.

61. The composite material of claim 55, wherein the superabsorbent material has an jonically charged surface.

62. The composite material of claim 61, wherein the superabsorbent material has an ionically charged surface ranging from about 1 to about 100% of the surface of the superabsorbent material.

63. The composite material of claim 55, wherein the superabsorbent material comprises a biodegradable polymer.

64. The composite material of claim 63, wherein the biodegradable polymer is selected from a polyethyleneglycol, a polylactic acid, a polyvinylalcohol, a co-polylactideglycolide, cellulose, alginic acids, carrageenans isolated from seaweeds, polysaccharides, pectins, xanthans, starch, or combinations thereof.

65. The composite material of claim 1, wherein the binder material comprises a clay material selected from smectic or montmorillinite clay.

66. The composite material of claim 65, wherein the clay material comprises bentonite.

67. The composite material of claim 5, wherein the composite material is in the form of a sheet and is disposed on a woven web.

68. The composite material of claim 5, wherein the composite material is in the form of a sheet and is disposed on a nonwoven web.

69. The composite material of claim 1, wherein the binder is present in an amount ranging from about 0.5 wt % and about 99.9 wt % of the total weight of the composite material.

70. The composite material of claim 1, further comprising a synthetic ion-exchange material.

71. The composite material of claim 1, wherein the composite material includes phosphates and fluid treatment carbon and the phosphates and fluid treatment carbon are each present in amounts of about 42.5 wt %, and the binder is present in an amount of about 15 wt %, based upon the total weight of the composite material.

72. The composite material of claim 1, wherein the composite material includes aluminum oxides and fluid treatment carbon and the aluminum oxides and fluid treatment carbon are each present in amounts of about 42.5 wt %, the binder is present in an amount of about 15 wt %, based upon the total weight of the composite material.

73. The composite material of claim 1, wherein the composite material includes silica materials and fluid treatment carbon and the silica materials and fluid treatment carbon are each present in amounts of about 42.5 wt %, the binder is present in an amount of about 15 wt %, based upon the total weight of the composite material.

74. The composite material of claim 1, wherein the composite material includes silica and wherein said silica is present in amounts of about 85 wt %, and the binder is present in an amount of about 15 wt %, based upon the total weight of said composite material.

75. The composite material of claim 1, further comprising an additional adsorptive material, wherein the additional adsorptive material comprises an ion-binding material selected from synthetic ion exchange resins, zeolites, phosphate minerals, or combinations thereof.

76. The composite material of claim 75, wherein the ion-binding material comprises synthetic ion exchange resins and the synthetic ion exchange resins are selected from functionalized styrenes, vinylchlorides, divinyl benzenes, methacrylates, acrylates or mixtures, copolymers, and blends thereof.

77. The composite material of claim 75, wherein the ion-binding material comprises natural or synthetic zeolites and wherein the natural or synthetic zeolites are silicate containing minerals selected from clinoptilolite or glauconate.

78. The composite material of claim 1, further comprising one or more materials that undergo an oxidation or a reduction in the presence of water or aqueous fluid.

79. The composite material of claim 1, wherein at least a portion of the surface modifying chemical generates a surface bound polar chemical group.

80. The composite material of claim 79, wherein at least a portion of the surface modifying chemical generates a surface bound chemical group with a positive electrical charge.

81. The composite material of ciaim 79, wherein at least a portion of the surface modifying chemical generates a surface bound chemical group with a negative electrical charge.

82. The composite material of claim 1, wherein the surface modifying chemical agent is selected from 3-acryloxypropylotrichlorosilane, 3-acrlyoxypropylotrimethocysilane, Allyltrichlorosilane, allyltrimethoxysilane, allyltriethoxysilane, 3-bromopropylotrichlorosilane, 3-bromopropyl-trimethoxysilane, (p-chloromethyl)phenyltrichlorosilane), (p-chloromethyl)phenyltrimethoxysilane, 1-trimethoxysilyl-2-2(p,m-chloromethyl)-phenylethane, chloromethyltrichlorosilane, chloromethyltriethoxysilane, 2-chloroethyltriethoxysilane, 3-chioropropyltrichlorosilane, 3-chloropropyl-trimethoxysilane, 3-glycidoxypropyltrimethoxysilane, 3-iodopropyl trimethoxysilane, 3-isocyanatopropyltriethoxysilane, 2-(diphenylphosphino) ethyltriethoxysilane, vinyltriacetoxysilane,vinyltrichlorosilane, vinyltriethoxysilane, vinyltrimethoxysilane, 3-mercaptopropyltrimethoxysilane, 3-mercaptopropyltriethoxysilane, N-(triethoxysilylpropyl) urea, 3-aminopropyl-triethoxysilane, 3-aminopropyltrimethoxy silane, N-(2-aminoethyl)-3-aminopropyltrimethoxysilane, 2-(carbomethoxy) ethyltrichiorosilane, N-[(3-trimethoxysilyl)propyl] ethylenediamine triacetic acid, trisodium salt, 3-cyanopropyltrichiorosilane, 3-cyanopropyltriethoxysilane, 2-(4-chlorosulfonylphenyl) ethyltrichiorosilane, 2-(4-chlorosulfonylphenyl) ethyltrimethoxysilane, 2-(trimethoxysilyl) ethyl-2-pyridine, N-(3-trimethoxysilylpropyl)pyrrole, N-octadecyldimethyl-1 (3-trimethoxysilyl) propyl]ammoniumchloride, N-trimethoxysilylpropyl-n,n,n-trimethyl ammoniym chloride, 3-(trimethoxysilyl) propyldimethyloctadecylammonium chloride silane quatemary amine, chioropropyl trihydroxy silane, or combinations thereof.

83. The composite material of claim 1, wherein at least a portion of the surface modifying chemical comprises silane and wherein the silane contains an amine.

84. The composite material of claim 83, wherein at least a portion of the surface modifying chemical contains a quaternary amine.

85. The composite material of claim 1, wherein at least a portion of the surface modifying chemical is used as a sizing agent.

86. The composite material of claim 85, wherein at least a portion of the sizing agent comprises aminopropyltrethoxysilane.

87. The composite material of claim 85, wherein at least a portion of said sizing agent is a siloxane.

88. The composite material of claim 1, wherein at least a portion of the surface modifying agent is a polymer.

89. The composite material of claim 1, wherein at least a portion of the surface modifying agent is a polymer selected from: polyamines, polyamides, polyalcohols, polysaacharides, polyacrylamides, polyacrylates, humic acids, peptides, proteins, polorganozirconates, polyorganoaluminates, polysiloxanes, polysilanes, polysilazanes, polycarbosilanes, polyborosilanes, zirconium dimethacrulate, zirconium tetramethacrylate, zirconium 2-ethyihexanoate, aluminum butoxides, aluminum diisopropoxide ethylacetoacetate, tetramethyldisiloxanes and derivatives thereof, tristrimethylsilylphosphate and tristrimethylsiloxyboron, polyamines such as poly (DADMAC), poly-DADM, polyamine-poly(DADMAC) blends, polyquartenary amines, inorganic-polyamine blends, and inorganic poly(DADMAC) blends, cationic starch, cationic poly-methylmethacrylates, copolymers of vinylimidazolium methochloride and vinylpyrrolidone, quarternized vinylpyrrolidone/dimethyl-aminoethyl-methacrylate copolymer, polyethyleneimine, or combinations thereof.

90. The composite material of claim 1, wherein at least a portion of the surface modifying generates a polymer or polymer network on the surface.

91. A device for reducing chemical contaminants from fluids, water or aqueous fluids and/or removing microorganisms and components thereof, comprising:

a housing; and the composite material of claim 1.

92. The device according to claim 91, wherein the housing comprises an inlet, an outlet, and a contacting chamber therebetween, and wherein the porous block is disposed within the contacting chamber, such that fluid can flow into the housing from the inlet passes through the porous block and then can flow out of the housing through the outlet.

93. A method for treating a fluid to convert contaminants from one chemical form to another chemical form, comprising:

causing the fluid to contact the composite material of claim 1, by flow through or over the composite material, thereby obtaining treated fluid.

94. A method for treating a fluid containing trivalent arsenic, pentavalent arsenic, hydrogen sulfide, and dissolved iron or combinations thereof, comprising:

causing the fluid to contact the composite material of claim 1, by flow through or over the composite material, thereby obtaining treated fluid.

95. A method for treating a fluid containing trivalent arsenic, pentavalent arsenic, hydrogen sulfide, and dissolved iron or combinations thereof, and for removing microorganisms or their components or a combination thereof comprising: causing the fluid to contact the composite material of claim 1, by flow through or over the composite material, thereby obtaining treated fluid.

96. A method for treating a fluid containing trivalent arsenic, pentavalent arsenic, hydrogen sulfide, and dissolved iron or combinations thereof, and reacting with chlorine containing compounds comprising:

causing the fluid to contact the composite material of claim 1, by flow through or over the composite material, thereby obtaining treated fluid.

97. A method for treating a fluid to remove microorganisms comprising:

causing the fluid to contact the composite material of claim 1, by flow through or over the composite material, thereby obtaining treated fluid.

98. A method for treating a fluid to remove the components of microorganisms or cells comprising: causing the fluid to contact the composite material of claim 1, by flow through or over the composite material, thereby obtaining treated fluid.

99. The method of claim 93, wherein the fluid is water.

100. The method of claim 99, wherein the water is potable.

101. The method of claim 93, wherein the fluid is an aqueous solution.

102. The method of claim 101, wherein the aqueous solution is blood.

103. The method of claim 101, wherein the aqueous solution is a fermentation broth.

104. The method of claim 101, wherein the aqueous solution is a recycled stream in a chemical or biological process.

105. The method of claim 101, wherein the aqueous solution is a recycled stream in a biotechnology process.

106. The method of claim 101, wherein the aqueous solution has been used in a surgical procedure.

107. The method of claim 93, wherein the fluid comprises air.

108. The method of claim 93, wherein the fluid comprises a purge gas.

109. The method of claim 108, wherein the purge gas is selected from $O_2$, $CO_2$, $N_2$, Ar, or combinations thereof.

110. The method of claim 93, wherein the fluid is an anesthetic gas.

111. The method of claim 110, wherein the anesthetic gas comprises nitrous oxide.

112. The method of claim 93, further comprising regenerating the composite material by sterilization.

113. The method of claim 112, wherein the sterilization comprises exposing the composite material to elevated temperature, pressure, radiation levels, chemical oxidants or reductants, or combinations thereof.

114. The method of claim 112, wherein the sterilization comprises autoclaving.

115. The method of claim 112, wherein the sterilization comprises electrochemical treatment.

116. The method of claim 112, wherein the sterilization comprises a combination of chemical oxidation and autoclaving.

117. The method of claim 93, wherein the fluid is a gaseous mixture.

118. The method of claim 117, wherein the gaseous mixture includes air.

119. The method of claim 117, wherein the gaseous mixture contains oxygen, carbon dioxide, nitrogen, argon, nitrogen oxide or a combination thereof.

120. The method of claim 119, wherein the gaseous mixture is used to pressurize a chamber.

121. The method of claim 119, wherein the gaseous mixture is used to sparge or purge an aqueous solution for the purpose of increasing the concentration of the sparging gas in the solution.

122. The method of claim 119, wherein the gaseous mixture is used to sparge or purge an aqueous solution for the purpose of decreasing the concentration of the sparging gas in the solution.

123. The method of claim 119, wherein the gaseous mixture is used to remove particulate material from surfaces.

124. A method for regeneration of the composite material of claim 1 comprising:
adding a solution including a regenerating material selected from salt, acid, caustic, oxidizer, or combinations thereof.

125. The method of claim 124, wherein the solution includes a regenerating material selected from chlorine, reactive peroxides, reactive permanganate, reactive carbonates, or combinations thereof.

* * * * *